(12) United States Patent
Nishimine et al.

(10) Patent No.: US 10,562,520 B2
(45) Date of Patent: Feb. 18, 2020

(54) CONTROL DEVICE FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Akiko Nishimine, Toyota (JP); Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 15/690,616

(22) Filed: Aug. 30, 2017

(65) Prior Publication Data

US 2018/0065622 A1     Mar. 8, 2018

(30) Foreign Application Priority Data

Sep. 7, 2016    (JP) .................................. 2016-175079

(51) Int. Cl.
     *B60W 20/40*      (2016.01)
     *B60W 30/182*     (2020.01)
     (Continued)

(52) U.S. Cl.
CPC ............. *B60W 20/40* (2013.01); *B60K 6/442* (2013.01); *B60K 6/445* (2013.01); *B60W 10/06* (2013.01); *B60W 10/08* (2013.01); *B60W 10/115* (2013.01); *B60W 10/18* (2013.01); *B60W 10/20* (2013.01); *B60W 20/20* (2013.01); *B60W 30/182* (2013.01); *B60W 50/082* (2013.01);
(Continued)

(58) Field of Classification Search
CPC .... B60W 20/40; B60W 30/182; B60W 10/06; B60W 10/08; B60W 10/115; B60W 10/18; B60W 10/20; B60W 20/20; B60W 50/082; B60W 2710/083; B60W 2710/0666; B60W 2540/12; B60W 2420/42; B60W 2510/0604; B60W 2510/0638; B60W 2510/081; B60W 2510/242; B60W 2520/14; B60W 2540/10; B60W 2550/40; B60W 2710/0644; B60W 2710/0672; B60W 2710/085; B60W 2750/40; B60K 6/445; B60K 6/442; B60K 6/383; B60K 6/365; Y02T 10/7077; Y02T 10/7275; Y02T 10/6286; Y02T 10/6234; Y02T 10/6239; Y10S 903/913; Y10S 903/91; Y10S 903/93

See application file for complete search history.

(56) References Cited

U.S. PATENT DOCUMENTS

| 5,906,645 A | 5/1999 | Kagawa et al. |
| 8,237,389 B2 * | 8/2012 | Fitch ................... B25J 13/06 180/271 |

(Continued)

FOREIGN PATENT DOCUMENTS

JP      H09-222922 A     8/1997

*Primary Examiner* — Jason Holloway
(74) *Attorney, Agent, or Firm* — Oliff PLC

(57) ABSTRACT

A control device for a vehicle includes an electronic control unit. The electronic control unit, when switching a traveling mode of the vehicle, is configured to control an amount of torque change produced in a drive power source for traveling subjected to switching in operation upon switching of the traveling mode, such that the amount of torque change during manual driving is larger than that during autonomous driving.

6 Claims, 8 Drawing Sheets

(51) Int. Cl.

| | | |
|---|---|---|
| *B60K 6/445* | (2007.10) | |
| *B60K 6/442* | (2007.10) | |
| *B60W 10/06* | (2006.01) | |
| *B60W 10/08* | (2006.01) | |
| *B60W 10/115* | (2012.01) | |
| *B60W 10/18* | (2012.01) | |
| *B60W 10/20* | (2006.01) | |
| *B60W 20/20* | (2016.01) | |
| *B60W 50/08* | (2020.01) | |
| B60K 6/365 | (2007.10) | |
| B60K 6/383 | (2007.10) | |

(52) U.S. Cl.
CPC .............. *B60K 6/365* (2013.01); *B60K 6/383* (2013.01); *B60W 2420/42* (2013.01); *B60W 2510/0604* (2013.01); *B60W 2510/0638* (2013.01); *B60W 2510/081* (2013.01); *B60W 2510/242* (2013.01); *B60W 2520/14* (2013.01); *B60W 2540/10* (2013.01); *B60W 2540/12* (2013.01); *B60W 2550/40* (2013.01); *B60W 2710/0644* (2013.01); *B60W 2710/0666* (2013.01); *B60W 2710/0672* (2013.01); *B60W 2710/083* (2013.01); *B60W 2710/085* (2013.01); *B60W 2750/40* (2013.01); *Y02T 10/6234* (2013.01); *Y02T 10/6239* (2013.01); *Y02T 10/6286* (2013.01); *Y02T 10/7077* (2013.01); *Y02T 10/7275* (2013.01); *Y10S 903/91* (2013.01); *Y10S 903/913* (2013.01); *Y10S 903/93* (2013.01)

(56) References Cited

U.S. PATENT DOCUMENTS

| | | | | |
|---|---|---|---|---|
| 9,342,074 | B2 * | 5/2016 | Dolgov | B60W 30/00 |
| 9,896,109 | B2 * | 2/2018 | Kuwahara | B60W 30/182 |
| 10,093,300 | B2 * | 10/2018 | Kuwahara | B60W 10/06 |
| 10,173,694 | B2 * | 1/2019 | Nishimine | B60W 20/15 |
| 10,232,838 | B2 * | 3/2019 | Nishimine | B60W 10/10 |
| 2016/0318514 | A1 * | 11/2016 | Kuwahara | B60W 10/06 |
| 2017/0151950 | A1 * | 6/2017 | Lien | B60W 30/182 |
| 2018/0065618 | A1 * | 3/2018 | Nishimine | B60W 10/10 |
| 2018/0251135 | A1 * | 9/2018 | Luo | B60W 50/08 |

* cited by examiner

CONTROL DEVICE FOR VEHICLE AND CONTROL METHOD FOR VEHICLE

INCORPORATION BY REFERENCE

The disclosure of Japanese Patent Application No. 2016-175079 filed on Sep. 7, 2016 including the specification, drawings and abstract is incorporated herein by reference in its entirety.

BACKGROUND

1. Technical Field

The disclosure relates to a control device for a vehicle capable of performing switching of a plurality of traveling modes, and switching between autonomous driving and manual driving, and also relates to a control method for the vehicle.

2. Description of Related Art

In Japanese Patent Application Publication No. 9-222922 (JP 9-222922 A), a traveling control system for a vehicle is disclosed which switches the vehicle between an autonomous driving mode under autonomous driving control, and a manual driving mode based on driving operation of a driver. The vehicle disclosed in JP 9-222922 A can be switched between the autonomous driving mode in which autonomous traveling is performed by controlling the vehicle speed and the steering angle based on signals from various sensors, and the manual driving mode based on driving operation of the driver.

SUMMARY

In a vehicle including a plurality of drive power sources, it is possible to switch the vehicle between/among two or more traveling modes in which difference ones of the drive power sources are used as a drive power source for traveling which generates drive torque, according to traveling conditions. For example, in a hybrid vehicle including an engine and a rotating machine as drive power sources, the traveling mode can be switched between a hybrid traveling mode in which at least the engine is used as the drive power source for traveling, and a motor traveling mode in which only the rotating machine is used as the drive power source for traveling, according to the traveling conditions. If the switching of the traveling mode is performed in the same manner during autonomous driving and during manual driving, the response may not be in accord with the intention of the driver. For example, if control that places an emphasis on suppression of shock is performed in the same manner during autonomous driving and during manual driving, smooth switching may be achieved during autonomous driving, but switching may be effected with poor response, against the intention of the driver, during manual driving.

This disclosure provides a control device for a vehicle and a control method for a vehicle, which can achieve switching of the traveling mode in a manner suitable for each of autonomous driving and manual driving.

A first aspect of the disclosure is a control device for a vehicle. The vehicle includes a plurality of drive power sources. The control device includes an electronic control unit. The electronic control unit is configured to switch a traveling mode of the vehicle according to traveling conditions of the vehicle. The traveling mode is selectable from a plurality of modes in which different ones of the drive power sources are used as a drive power source for traveling which generates drive torque. The electronic control unit is configured to switch driving control of the vehicle between autonomous driving under autonomous driving control, and manual driving based on driving operation of a driver. The electronic control unit is configured to control an amount of torque change produced in the drive power source for traveling subjected to switching in operation due to switching of the traveling mode, such that the amount of torque change produced at the time of switching of the traveling mode during the manual driving is larger than the amount of torque change produced at the time of switching of the traveling mode during the autonomous driving.

According to the configuration as described above, if the vehicle is traveling in the manual driving mode when the traveling mode is switched, the amount of torque change produced in the drive power source for traveling subjected to switching in operation upon switching of the traveling mode is set to a larger value than that in the case where the vehicle is traveling in the autonomous driving mode. Therefore, during autonomous driving, the amount of torque change in the drive power source for traveling subjected to switching in operation upon switching of the traveling mode is made relatively small, and switching shock is suppressed. On the other hand, during manual driving, the amount of torque change in the drive power source for traveling subjected to switching in operation upon switching of the traveling mode is made relatively large, and the switching response is improved. Accordingly, it is possible to improve the switching response of the traveling mode during manual driving, while suppressing switching shock of the traveling mode during autonomous driving. Namely, it is possible to achieve switching of the traveling mode in a manner suitable for each of autonomous driving and manual driving.

In the control device as described above, the electronic control unit may be configured to increase torque produced in the drive power source for traveling subjected to switching, when the electronic control unit switches the traveling mode in response to accelerating operation of the driver during the manual driving. When the electronic control unit switches the traveling mode in response to the accelerating operation, the electronic control unit may be configured to set the amount of torque change when an amount of accelerating operation by the driver is large, to a larger value than the amount of torque change when the amount of accelerating operation is small.

With the configuration as described above, of the amount of accelerating operation is large when the traveling mode is switched in response to accelerating operation during manual driving, the amount of change by which torque is increased in the drive power source for traveling subjected to switching in operation upon switching of the traveling mode is made relatively large. Therefore, it is possible to achieve switching of the traveling mode with good response, according to the driver's intention to accelerate the vehicle.

In the control device as described above, the electronic control unit may be configured to reduce torque produced in the drive power source for traveling subjected to switching, when the electronic control unit switches the traveling mode in response to decelerating operation of the driver during the manual driving. When the electronic control unit switches the traveling mode in response to the decelerating operation, the electronic control unit may be configured to set the amount of torque change when an amount of decelerating operation by the driver is large, to a larger value than the amount of torque change when the amount of decelerating operation is small.

In the control device as described above, the drive power sources may include an engine and a rotating machine. The traveling mode may be selectable from a hybrid traveling mode and a motor traveling mode. The hybrid traveling mode may be a mode in which at least the engine is used as the drive power source for traveling. The motor traveling mode may be a mode in which the rotating machine is used as the drive power source for traveling. The electronic control unit may be configured to set the amount of torque change produced in the engine when the electronic control unit switches the traveling mode between the hybrid traveling mode and the motor traveling mode during the manual driving, to a larger value than the amount of torque change produced in the engine when the electronic control unit switches the traveling mode between the hybrid traveling mode and the motor traveling mode during the autonomous driving.

With the configuration as described above, if the vehicle is traveling in the manual driving mode when the traveling mode is switched between the hybrid traveling mode and the motor traveling mode, the amount of torque change produced in the engine is set to a larger value than that in the case where the vehicle is traveling in the autonomous driving mode. Therefore, during autonomous driving, the amount of torque change in the engine is made relatively small, and switching shock is suppressed. During manual driving, on the other hand, the amount of torque change in the engine is made relatively large, and the switching response is improved.

In the control device as described above, the drive power sources may include a first rotating machine and a second rotating machine. The traveling mode may be selectable from a both-drive motor traveling mode and a single-drive motor traveling mode. The both-drive motor traveling mode may be a mode in which the first rotating machine and the second rotating machine are used as the drive power sources for traveling. The single-drive motor traveling mode may be a mode in which only the second rotating machine is used as the drive power source for traveling. The electronic control unit may be configured to set the amount of torque change produced in the first rotating machine when the electronic control unit switches the traveling mode between the both-drive motor traveling mode and the single-drive motor traveling mode during the manual driving, to a larger value than the amount of torque change produced in the first rotating machine when the electronic control unit switches the traveling mode between the both-drive motor traveling mode and the single-drive motor traveling mode during the autonomous driving.

With the configuration as described above, if the vehicle is traveling in the manual driving mode when the traveling mode is switched between the both-drive motor traveling mode and the single-drive motor traveling mode, the amount of torque change produced in the first rotating machine is set to a larger value than that in the case where the vehicle is traveling in the autonomous driving mode. Therefore, during autonomous driving, the amount of torque change in the first rotating machine is made relatively small, and switching shock is suppressed. On the other hand, during manual driving, the amount of torque change in the first rotating machine is made relatively large, and the switching response is improved.

A second aspect of the disclosure is concerned with a control method for a vehicle. The vehicle includes a plurality of drive power sources and an electronic control unit. The control method includes: switching, by the electronic control unit, a traveling mode of the vehicle according to traveling conditions of the vehicle, the traveling mode being selectable from a plurality of modes in which different ones of the drive power sources are used as a drive power source for traveling which generates drive torque; switching, by the electronic control unit, driving control of the vehicle between autonomous driving under autonomous driving control, and manual driving based on driving operation of a driver; and controlling, by the electronic control unit, an amount of torque change produced in the drive power source for traveling subjected to switching in operation due to switching of the traveling mode, such that the amount of torque change produced at the time of switching of the traveling mode during the manual driving is larger than the amount of torque change produced at the time of switching of the traveling mode during the autonomous driving.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Each embodiment of the disclosure will be described in detail with reference to the drawings.

First Embodiment

Figure 1:
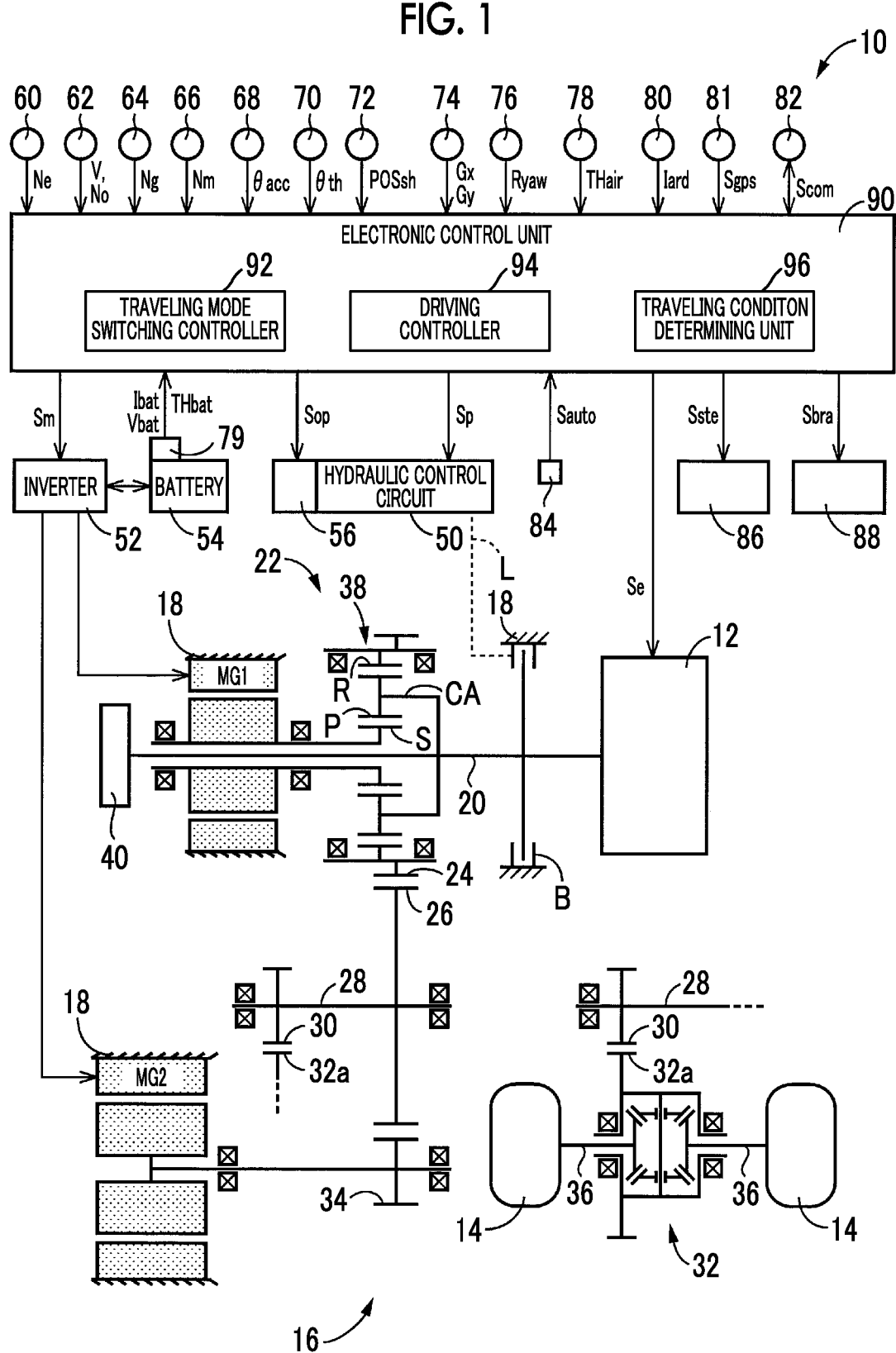
FIG. 1 is a view showing the general configuration of a vehicle to which the disclosure is applied, and also showing a principal part of a control system for controlling each part of the vehicle involved in traveling.

FIG. 1 shows the general configuration of a vehicle 10 to which the disclosure is applied, and also shows a principal part of a control system for controlling each part of the vehicle 10 involved in traveling. In FIG. 1, the vehicle 10 is a hybrid vehicle including an engine 12, a first rotating machine MG1, and a second rotating machine MG2, as a plurality of drive power sources, which can be drive power sources that generate drive torque and cause the vehicle to travel. The vehicle 10 also includes a power transmission unit 16 provided in a power transmission path between the engine 12 and drive wheels 14.

The engine 12 is an internal combustion engine, such as a gasoline engine or a diesel engine, which delivers power by burning certain fuel. Operating conditions, such as the throttle opening or intake air amount, fuel supply amount, and the ignition timing, of the engine 12 are controlled by an electronic control unit 90 that will be described later, so that engine torque Te is controlled.

Both of the first rotating machine MG1 and the second rotating machine MG2 are rotating machines that can be drive power sources for traveling. Each of the first rotating machine MG1 and the second rotating machine MG2 is a so-called motor-generator having a function as an electric motor (motor) that generates drive torque, and a function as a generator. Each of the first rotating machine MG1 and the second rotating machine MG2 is connected to a battery 54 that will be described later, via an inverter 52 that will be described later. With the inverter 52 controlled by the electronic control unit 90, MG1 torque Tg and MG2 torque Tm as output torque (power running torque or regenerative torque) of the first rotating machine MG1 and the second rotating machine MG2 are controlled.

The power transmission unit 16 includes an input shaft 20 coupled to the engine 12, a speed change unit 22 coupled to the input shaft 20, a driven gear 26 that meshes with a drive gear 24 as an output rotating member of the speed change unit 22, a driven shaft 28 on which the driven gear 26 is fixedly mounted such that they cannot rotate relative to each other, a final gear 30 (having a smaller diameter than the driven gear 26) fixedly mounted on the driven shaft 28 such that they cannot rotate relative to each other, a differential gear 32 that meshes with the final gear 30 via a differential ring gear 32a, a reduction gear 34 (having a smaller diameter than the driven gear 26) that meshes with the driven gear 26 and is coupled to the second rotating machine MG2, and so forth. These components are housed in a case 18 as a non-rotating member mounted on the vehicle body. The power transmission unit 16 includes axles 36, etc. coupled to the differential gear 32. In the power transmission unit 16 thus constructed, power of the engine 12, power of the first rotating machine MG1, and power of the second rotating machine MG2 are transmitted to the driven gear 26, and then transmitted from the driven gear 26 to the drive wheels 14, via the final gear 30, differential gear 32, axles 36, and so forth, in this order.

The speed change unit 22 has a planetary gear mechanism 38 as a power split device that splits (or distributes) power transmitted from the engine 12 via the input shaft 20, to the first rotating machine MG1 and the drive gear 24. The planetary gear mechanism 38 is a known single-pinion planetary gear set including a sun gear S, pinion gears P, carrier CA that supports the pinion gears P such that they can rotate about themselves and about the axis of the mechanism 38, and a ring gear R that meshes with the sun gear S via the pinion gears P. The planetary gear mechanism 38 functions as a differential mechanism that performs differential operation. In the planetary gear mechanism 38, the sun gear S is coupled to the first rotating machine MG1, and the carrier CA is coupled to the engine 12 via the input shaft 20, while the ring gear R is formed on an inner circumferential surface of the drive gear 24. Thus, in the vehicle 10, reaction force of the engine torque Te applied to the carrier CA is taken by the first rotating machine MG1, so that the vehicle 10 can travel with power of the engine, namely, with directly-reached torque (that will also be called "engine directly-reached torque) that is mechanically transmitted to the ring gear R, and MG2 torque Tm produced by the second rotating machine MG2 that is driven with electric power generated by the first rotating machine MG1 by use of power of the engine 12 distributed to the first rotating machine MG1. Thus, the speed change unit 22 functions as an electric differential unit (electric continuously variable transmission) that controls the gear ratio (speed ratio), with the electronic control unit 90 controlling the inverter 52 and thus controlling operating conditions of the first rotating machine MG1.

The vehicle 10 further includes a mechanical oil pump 40 (which will be called "MOP 40") that is coupled to the input shaft 20 and rotated/driven by the engine 12, a brake B as a lock mechanism that fixes the input shaft 20 to the case 18 (namely, fixes a crankshaft as a rotary shaft of the engine 12, to the case 18), a hydraulic control circuit 50 that supplies an engaging pressure to the brake B, inverter 52, battery 54, an electric oil pump 56 (which will be called "EOP 56"), and so forth. The inverter 52 controls transfer of electric power associated with operation of each rotating machine MG1, MG2, so that the MG1 torque Tg required of the first rotating machine MG1 and the MG2 torque Tm required of the second rotating machine MG2 can be obtained. The battery 54 functions as a power storage device that supplies and receives electric power to and from each of the first rotating machine MG1 and the second rotating machine MG2. In the power transmission unit 16, hydraulic oil L used for switching of the operating state of the brake B and lubricating or cooling each part of the planetary gear mechanism 38, etc. is supplied from the MOP 40 or the EOP 56.

The brake B is a multi-plate hydraulic friction device that is controlled to be engaged by a hydraulic actuator, for example. The operating state of the brake B is controlled between an engaged state (including slipping engagement) and a released state, according to the engaging pressure supplied from the hydraulic control circuit 50. When the brake B is released, the crankshaft of the engine 12 is placed in a condition where it can rotate relative to the case 18. On the other hand, when the brake B is engaged, the crankshaft of the engine 12 is placed in a condition where it cannot rotate relative to the case 18. Namely, with the brake B placed in the engaged state, the crankshaft of the engine 12 is fixed (or locked) to the case 18.

The vehicle 10 further includes the electronic control unit 90 including a traveling control device that controls each part involved in traveling. The electronic control unit 90 includes a so-called microcomputer having CPU, RAM, ROM, input and output interfaces, etc., for example, and the CPU performs signal processing according to programs stored in advance in the ROM, while utilizing the temporary storage function of the RAM, so as to perform various controls of the vehicle 10. For example, the electronic control unit 90 is adapted to perform vehicle control, such as hybrid drive control, with respect to the engine 12, first rotating machine MG1, second rotating machine MG2, etc., and includes respective computers for engine control, rotating machine control, hydraulic control, etc. as needed.

The electronic control unit 90 is supplied with various signals, etc. based on detection values obtained by various sensors, etc. included in the vehicle 10. For example, the sensors, etc. include an engine speed sensor 60, output rotational speed sensor 62, MG1 rotational speed sensor 64, such as a resolver, MG2 rotational speed sensor 66, such as a resolver, accelerator pedal stroke sensor 68, throttle opening sensor 70, shift position sensor 72, G sensor 74, yaw rate sensor 76, outside air temperature sensor 78, battery sensor 79, course recognition and obstacle detection sensor 80, such as a vehicle-mounted camera, GPS antenna 81, antenna 82 for outside network communications, autonomous driving selection switch 84 that allows the driver to select autonomous driving, and so forth. The above-mentioned various signals include, for example, signals indicative of the engine speed Ne, output rotational speed No as the rotational speed of the drive gear 24 corresponding to the vehicle speed V, MG1 rotational speed Ng as the rotational speed of the first rotating machine MG1, MG2 rotational speed Nm as the rotational speed of the second rotating machine MG2, accelerator pedal stroke θacc as the operation amount of the accelerator pedal which represents the amount of accelerating operation of the driver, throttle opening θth as the opening of the electronic throttle valve, operation position (shift position) POSsh, such as "P", "R", "N", "D", of a shift lever, longitudinal acceleration Gx of the vehicle 10, lateral acceleration Gy of the vehicle 10, yaw rate Ryaw as the angular velocity of rotation about the vertical axis of the vehicle 10, outside air temperature THair around the vehicle 10, battery temperature THbat, battery charge/discharge current Ibat, and battery voltage Vbat of the battery 54, vehicle surrounding information Iard, GPS signal (orbit signal) Sgps, communication signal Scom, autonomous driving selection signal Sauto, and so forth. Also, various command signals are generated from the electronic control unit 90, to respective devices included in the vehicle 10. For example, the devices include the engine 12, hydraulic control circuit 50, inverter 52, EOP 56, antenna 82 for outside network communications, steering actuator 86, brake actuator 88, and so forth. The above-mentioned various command signals include, for example, an engine control command signal Se for controlling the engine 12, hydraulic control command signal Sp for controlling the brake B, rotating machine control command signal Sm for operating the inverter 52 that controls each of the rotating machines MG1, MG2, EOP control command signal Sop for controlling the EOP 56, communication signal Scom, steering signal Sste for operating the steering actuator 86 that controls steering of the wheels (in particular, front wheels), brake signal Sbra for operating the brake actuator 88 that controls foot brake, and so forth. The electronic control unit 90 calculates the state of charge (charging capacity) SOC of the battery 54, based on the battery charge/discharge current Ibat and the battery voltage Vbat, for example.

The electronic control unit 90 performs traveling mode switching control, driving control, etc., so as to fulfill control functions for various controls in the vehicle 10. Here, the function of the traveling mode switching control included in the electronic control unit 90 will be referred to as a traveling mode switching controller 92, and the function of driving control will be referred to as a driving controller 94.

The traveling mode switching controller 92 outputs the engine control command signal Se for controlling opening/closing of the electronic throttle valve, controlling the fuel injection amount and the injection timing, and controlling the ignition timing, so as to execute output control of the engine 12 so that a target value of the engine torque Te is obtained. Also, the traveling mode switching controller 92 outputs the rotating machine control signal Sm for controlling operation of the first rotating machine MG1 and the second rotating machine MG2, to the inverter 52, so as to execute output control of the first rotating machine MG1 and the second rotating machine MG2, so that target values of the MG1 torque Tg and the MG2 torque Tm are obtained.

More specifically, the traveling mode switching controller 92 calculates drive torque (required drive torque) required at the vehicle speed V detected at this time, from the accelerator pedal stroke θacc, and causes at least one of the engine 12, first rotating machine MG1, and the second rotating machine MG2 to generate the required drive torque, so as to operate the vehicle with a lower fuel consumption and a reduced amount of exhaust emissions, in view of a charge request value (charge request power), etc. Namely, the traveling mode switching controller 92 switches the traveling mode of the vehicle 10 between/among a plurality of traveling modes in which different ones of the drive power sources for traveling are used as the drive power source(s) for traveling, according to traveling conditions.

The traveling mode switching controller 92 establishes a selected one of a motor traveling (or EV traveling) mode and a hybrid traveling (or HV traveling) mode, as the traveling mode, according to traveling conditions. For example, the traveling mode switching controller 92 establishes the EV traveling mode, when the required drive torque is in a motor traveling region that is smaller than a predetermined threshold value that is empirically obtained or obtained by calculation and stored in advance. On the other hand, when the required drive torque is in a hybrid traveling region that is equal to or larger than the predetermined threshold value, the traveling mode switching controller 92 establishes the HV traveling mode. Also, even when the required drive torque is in the motor traveling region, the traveling mode switching controller 92 establishes the HV traveling mode if the charging capacity SOC is smaller than a predetermined threshold value.

When the EV traveling mode is established, the traveling mode switching controller 92 stops operation of the engine 12, and permits motor traveling (EV traveling) using at least one rotating machine (in particular, the second rotating machine MG2) of the first rotating machine MG1 and the second rotating machine MG2, as the drive power source(s) for traveling. If the required drive torque can be provided solely by the second rotating machine MG2 when the EV traveling mode is established, the traveling mode switching controller 92 establishes a single-drive EV traveling mode. On the other hand, if the required drive torque cannot be provided solely by the second rotating machine MG2, the traveling mode switching controller 92 establishes a both-drive EV traveling mode. When the single-drive EV traveling mode is established, the traveling mode switching controller 92 permits EV traveling using only the second rotating machine MG2 as the drive power source for traveling. When the both-drive EV traveling mode is established, the traveling mode switching controller 92 permits EV traveling using both the first rotating machine MG1 and the second rotating machine MG2 as the drive power sources for traveling. Thus, in the both-drive EV traveling mode, the traveling mode switching controller 92 performs EV traveling, by operating or driving two rotating machines, i.e., the first rotating machine MG1 and the second rotating machine MG2. The traveling mode switching controller 92 establishes the both-drive EV traveling mode even when the required drive torque can be provided solely by the second rotating machine MG2, if an operating point of the second rotating machine MG2 represented by the MG2 rotational speed Nm and the MG2 torque Tm is within a predetermined range in which the efficiency of the second rotating machine MG2 deteriorates (in other words, if the higher efficiency is achieved when the first rotating machine MG1 and the second rotating machine MG2 are both used). When the both-drive EV traveling mode is established, the traveling mode switching controller 92 imparts the required drive torque to the first rotating machine MG1 and the second rotating machine MG2, based on the operation efficiencies of the first rotating machine MG1 and the second rotating machine MG2.

When the HV traveling mode is established, the traveling mode switching controller 92 causes reaction force against the power of the engine 12 to be held by electric power generation of the first rotating machine MG1, so that engine directly-reached torque is transmitted to the drive gear 24, and the second rotating machine MG2 is driven with electric power generated by the first rotating machine MG1, so that torque is transmitted to the drive wheels 14. Thus, the traveling mode switching controller 92 permits HV traveling (which will also be called "engine traveling") using at least the engine 12 as the drive power source for traveling. Namely, when the HV traveling mode is established, the traveling mode switching controller 92 permits the vehicle to travel in the HV traveling mode in which the operating state of the first rotating machine MG1 is controlled so that power of the engine 12 is transmitted to the drive wheels 14. In the HV traveling mode, the vehicle may be able to travel with drive torque produced by the second rotating machine MG2 using electric power from the battery 54 further added.

The traveling mode switching controller 92 outputs the hydraulic control command signal Sp for controlling operation of the brake B, to the hydraulic control circuit 50, based on the traveling mode established. More specifically, the traveling mode switching controller 92 controls engagement or release of the brake B, namely, controls fixing of the crankshaft of the engine 12 to the case 18, or release of the fixed state, by controlling the engaging pressure supplied from the hydraulic control circuit 50 to the hydraulic actuator of the brake B. When the both-drive EV traveling mode is established in the EV traveling mode, the traveling mode switching controller 92 engages the brake B by increasing the engaging pressure, so as to fix the crankshaft of the engine 12 to the case 18. When the HV traveling mode is established, or the single-drive EV traveling mode is established in the EV traveling mode, the traveling mode switching controller 92 releases the brake B by reducing the engaging pressure, so as to cancel fixing of the crankshaft of the engine 12 to the case 18, or release the crankshaft from the case 18.

The traveling mode switching controller 92 outputs the EOP control command signal Sop for controlling operation of the EOP 56, to the EOP 56. More specifically, in the both-drive EV traveling mode, rotation of the engine 12 is stopped, and supply of the hydraulic oil L by the MOP 40 is stopped. Therefore, the traveling mode switching controller 92 operates the EOP 56 when the both-drive EV traveling mode is established in the EV traveling mode. Namely, the traveling mode switching controller 92 operates the EOP 56 during driving of both of the rotating machines MG1, MG2.

When the traveling mode is switched from the EV traveling mode to the HV traveling mode, the traveling mode switching controller 92 starts the engine 12 by raising the engine speed Ne by use of the first rotating machine MG1 and effecting ignition, while the brake B is in the released state. When the traveling mode is switched from the HV traveling mode to the EV traveling mode, the traveling mode switching controller 92 stops operation of the engine 12 by stopping supply of the fuel into the engine 12.

Figure 2:
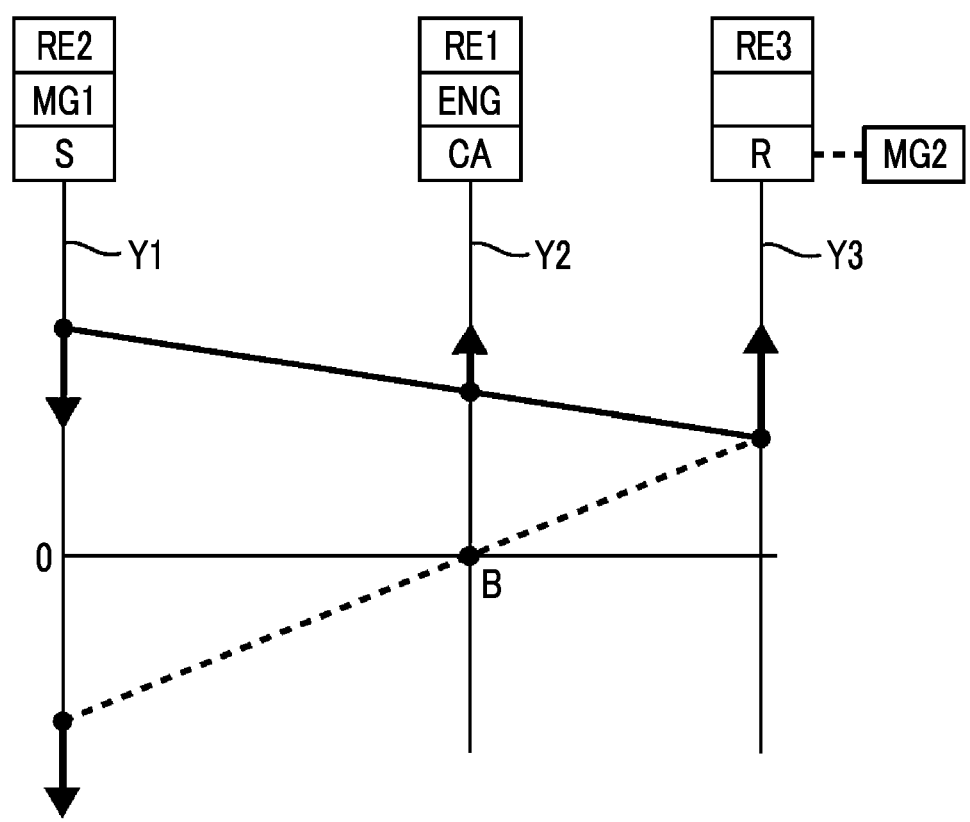
FIG. 2 is a nomographic chart showing the relationship among the rotational speeds of respective rotating elements in a planetary gear mechanism, in which a solid line indicates one example of traveling state when the vehicle is in an HV traveling mode, and a broken line indicates one example of traveling state when the vehicle is in an EV traveling mode.

FIG. 2 is a nomographic chart showing the relationship among the rotational speeds of three rotating elements RE1, RE2, RE3 in the planetary gear mechanism 38. In the nomographic chart, vertical lines Y1, Y2, Y3 are arranged in this order from the left-hand side on the paper. The vertical line Y1 indicates the rotational speed of the sun gear S as a second rotating element RE2 that is coupled to the first rotating machine MG1, and the vertical line Y2 indicates the rotational speed of the carrier CA as a first rotating element RE1 that is coupled to the engine (ENG) 12, while the vertical line Y3 indicates the rotational speed of the ring gear R as a third rotating element RE3 that rotates as a unit with the drive gear 24. The second rotating machine MG2 is coupled to the third rotating element RE3, via the driven gear 26, reduction gear 34, etc. In FIG. 2, a solid line indicates one example of the relative speeds of the respective rotating elements when the vehicle is traveling in the HV traveling mode, and the broken line indicates one example of the relative speeds of the respective rotating elements when the vehicle is traveling in the EV traveling mode.

The operation of the vehicle 10 in the HV traveling mode will be described using the solid line of FIG. 2. In this condition, the brake B is released, and the crankshaft of the engine 12 is not fixed to the case 18. The MG1 torque Tg is applied to the sun gear S, against the engine torque Te applied to the carrier CA. At this time, control for setting the operating point of the engine 12 represented by the engine speed Ne and the engine torque Te to an operating point having the best fuel economy can be carried out through power running control or reaction force control of the first rotating machine MG1, for example. This type of hybrid mode may be called "mechanical power-split type" or "power-split type".

The operation of the vehicle 10 in the single-drive EV traveling mode as one EV traveling mode will be described using the broken line of FIG. 2. In this mode, the engine 12 is not driven (namely, operation of the engine 12 is in a stopped state), and the first rotating machine MG1 is placed in a non-load (free) state, so that the engine speed Ne is made equal to zero. In this single-drive EV traveling mode, the brake B is released, and the crankshaft of the engine 12 is not fixed to the case 18. In this condition, power running torque of the second rotating machine MG2 is transmitted to the drive wheels 14 as driving force in the vehicle forward direction.

The operation of the vehicle 10 in the both-drive EV traveling mode as the other EV traveling mode will be described using the broken line of FIG. 2. In this mode, the engine 12 is not driven, and the engine speed Ne is made equal to zero. In the both-drive EV traveling mode, the traveling mode switching controller 92 causes the brake B to be engaged so that the crankshaft of the engine 12 is fixed to the case 18. Accordingly, the engine 12 is non-rotatably fixed (locked). With the brake B thus placed in the engaged state, power running torque of the second rotating machine MG2 is transmitted to the drive wheels 14 as driving force in the vehicle forward direction. Also, reaction force torque of the first rotating machine MG1 is transmitted to the drive wheels 14 as driving force in the vehicle forward direction. Thus, in the vehicle 10, the crankshaft of the engine 12 is locked by the brake B, so that the first rotating machine MG1 and the second rotating machine MG2 can be both used as driving sources for traveling. In this manner, in a so-called plug-in hybrid vehicle, for example, when the battery 54 is given a large capacity (high power), it is possible to achieve high power or output in traveling with motors while curbing increase in the size of the second rotating machine MG2.

The driving controller 94 switches the vehicle 10 between an autonomous driving mode under autonomous driving control, and a manual driving mode based on driving operation of the driver. The manual driving mode is a driving method for running the vehicle 10 based on driving operation, such as accelerating operation, braking operation, steering operation, etc. performed by the driver. The autonomous driving mode is a driving method for running the vehicle 10 by automatically effecting acceleration or deceleration, braking, steering, etc. under control of the electronic control unit 90, based on signals from various sensors and information, irrespective of the driving operation (intention) of the driver.

More specifically, the driving controller 94 executes the manual driving mode when the autonomous driving mode is not selected with the autonomous driving selection switch 84, and executes the autonomous driving mode when the autonomous driving selection switch 84 is operated by the driver, and the autonomous driving mode is selected. When the driving controller 94 determines that any driving operation, such as accelerating operation, braking operation, or steering operation, has been performed by the driver, during autonomous driving, the controller 94 switches the vehicle 10 to the manual driving mode. Also, when the driving controller 94 determines that an emergency has occurred during autonomous driving, it switches the vehicle 10 to the manual driving mode. The emergency is, for example, a situation where autonomous driving cannot be safely performed due to an abnormality in communications needed for autonomous driving, for example, hacking (hacking into the electronic control unit 90 via communication lines), or an error in sending or receiving of the communication signal Scom. Also, when the driving controller 94 determines during autonomous driving that autonomous driving cannot be carried out, based on road conditions, the controller 94 switches the vehicle 10 to the manual driving mode. When the driving controller 94 temporarily switches the vehicle 10 to the manual driving mode based on road conditions during autonomous driving, and then determines, based on road conditions, that the vehicle 10 can return to the autonomous driving mode, the controller 94 switches the vehicle 10 to the autonomous driving mode. When the autonomous driving selection switch 84 is operated by the driver, and the autonomous driving mode is selected, in a condition where occurrence of an emergency is determined, during manual driving, the driving controller 94 inhibits the vehicle 10 from switching to the autonomous driving mode, and keeps the vehicle 10 in the manual driving mode.

The driving controller 94 controls the engine 12 and the rotating machines MG1, MG2, respectively, and also operates the steering actuator 86 and the brake actuator 88, based on signals from various sensors, information, etc., so as to perform autonomous driving.

In the meantime, if control is performed at the time of switching of the traveling mode, with an emphasis placed on suppression of shock caused by switching of the drive power source for traveling, the switching may suffer from poor response. While smooth traveling with reduced shock is desirable during autonomous driving, switching with good response according to the driver's intention to accelerate or decelerate the vehicle is considered desirable during manual driving.

Thus, in order to achieve switching of the traveling mode in a manner suitable for each of autonomous driving and manual driving, if the vehicle 10 is traveling in the manual driving mode when the traveling mode is switched, the traveling mode switching controller 92 sets the amount of torque change (which will be referred to as "torque change amount") produced in the drive power source for traveling subjected to switching in operation upon switching of the traveling mode, to a larger value than that in the case where the vehicle 10 is traveling in the autonomous driving mode.

The electronic control unit 90 performs control for achieving switching of the traveling mode as described above. The electronic control unit 90 has a function of determining traveling conditions, which function will be referred to as a traveling condition determining unit 96, for the sake of convenience.

The traveling condition determining unit 96 determines whether it is the time to switch the traveling mode, namely, whether there is a request for switching of the traveling mode. The switching of the traveling mode may be switching between the HV traveling mode and the EV traveling mode, for example. The traveling condition determining unit 96 determines whether it is the time to switch the traveling mode between the HV traveling mode and the EV traveling mode, namely, whether there is a request for switching between the HV traveling mode and the EV traveling mode. The request for switching between the HV traveling mode and the EV traveling mode may be a request for switching from the EV traveling mode to the HV traveling mode, for example. In another example, the request for switching between the HV traveling mode and the EV traveling mode may be a request for switching from the HV traveling mode to the EV traveling mode, for example.

The traveling condition determining unit 96 also determines whether the vehicle 10 is traveling in the autonomous driving mode, or in the manual driving mode.

If the traveling condition determining unit 96 determines that the vehicle 10 is traveling in the manual driving mode when the traveling condition determining unit 96 determines that there is a request for switching between the HV traveling mode and the EV traveling mode, the traveling mode switching controller 92 sets the amount of torque change produced in the engine 12 as the drive power source for traveling subjected to switching in operation upon switching of the traveling mode, to a larger value than that in the case where the traveling condition determining unit 96 determines that the vehicle 10 is traveling in the autonomous driving mode.

When the request for switching between the HV traveling mode and the EV traveling mode is a request for switching from the EV traveling mode to the HV traveling mode, the engine 12 as the drive power source for traveling subjected to switching in operation upon switching of the traveling mode is started, and engine torque Te is caused to rise or increase. If the traveling condition determining unit 96 determines that the vehicle 10 is traveling in the autonomous driving mode when it determines that there is a request for switching from the EV traveling mode to the HV traveling mode, the traveling mode switching controller 92 sets the rate of initial rise of the engine torque Te to a predetermined value A (>0). On the other hand, if the traveling condition determining unit 96 determines that the vehicle 10 is traveling in the manual driving mode when it determines that there is a request for switching from the EV traveling mode to the HV traveling mode, the traveling mode switching controller 92 sets the rate of initial rise of the engine torque Te to a predetermined value B (>A), which is a larger rate than that in the case where the vehicle 10 is traveling in the autonomous driving mode. Thus, when the vehicle 10 is traveling in the manual driving mode, the amount of torque change produced in the engine 12 is made larger than that in the case where the vehicle 10 is traveling in the autonomous driving mode.

Figure 3:
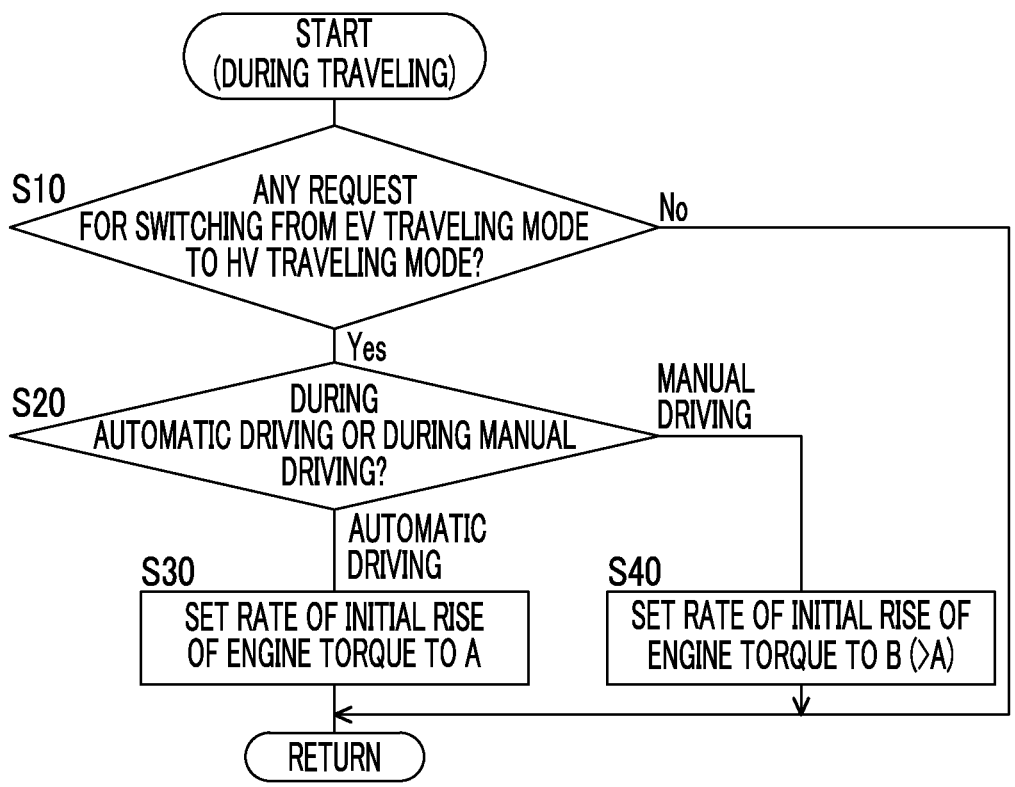
FIG. 3 is a flowchart illustrating a principal part of control operation of an electronic control unit, namely, control operation for achieving switching of the traveling mode in a manner suitable for each of autonomous driving and manual driving.
Figure 4:
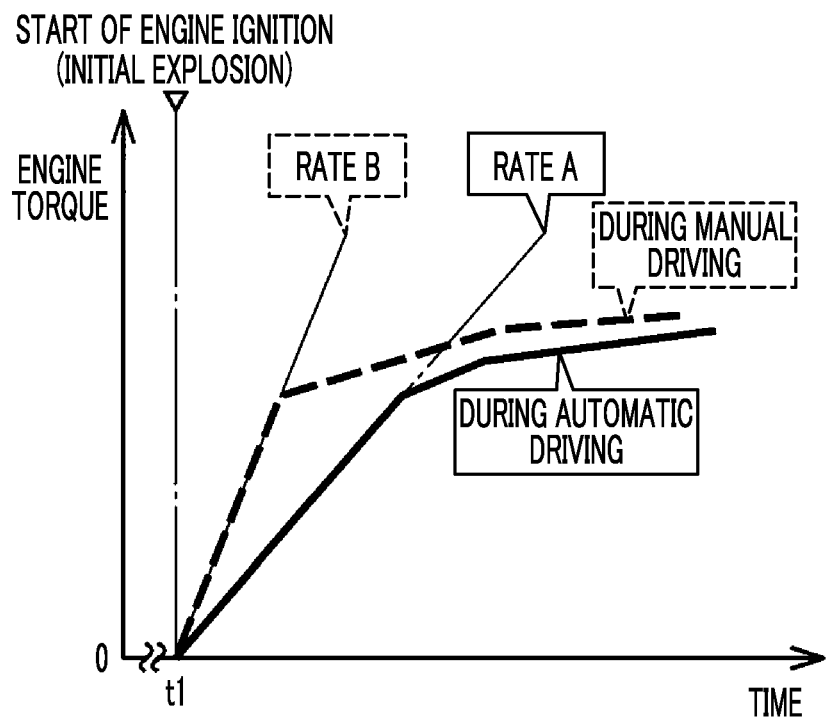
FIG. 4 is a view showing one example of a time chart of the case where the control operation illustrated in the flowchart of FIG. 3 is carried out.

FIG. 3 is a flowchart illustrating a principal part of control operation of the electronic control unit 90, namely, control operation for achieving switching of the traveling mode in a manner suitable for each of autonomous driving and manual driving. A control routine of FIG. 3 is repeatedly executed during traveling, for example. FIG. 4 shows one example of a time chart of the case where the control operation illustrated in the flowchart of FIG. 3 is carried out.

In FIG. 3, initially in step S10 corresponding to a function of the traveling condition determining unit 96, it is determined whether there is a request for switching from the EV traveling mode to the HV traveling mode. If a negative decision (NO) is obtained in step S10, the current cycle of this routine ends. If an affirmative decision (YES) is obtained in step S10, it is determined in step S20 corresponding to a function of the traveling condition determining unit 96 whether the vehicle 10 is traveling in the autonomous driving mode or in the manual driving mode. If it is determined in step S20 that the vehicle 10 is traveling in the automatic traveling mode, the rate of initial rise of the engine torque Te is set to A (>0), in step S30 corresponding to a function of the traveling mode switching controller 92. On the other hand, if it is determined in the above step S20 that the vehicle 10 is traveling in the manual traveling mode, the rate of initial rise of the engine torque Te is set to B (>A), in step S40 corresponding to a function of the traveling mode switching controller 92.

FIG. 4 shows one example of the case where switching from the EV traveling mode to the HV traveling mode is requested in response to increase in the accelerator pedal stroke θacc during EV traveling, and the engine 12 is started. In FIG. 4, the engine 12 starts ignition (initial explosion) under starting control of the engine 12 (see time t1 in FIG. 4), and engine torque Te starts rising. During autonomous driving as indicated by a solid line, the rate of initial rise of the engine torque Te is set to A (>0). On the other hand, during manual driving as indicated by a broken line, the rate of initial rise of the engine torque Te is set to B that is larger than A, and the amount of torque change produced in the engine 12 is made larger than that in the case where the vehicle 10 is traveling in the autonomous driving mode.

As described above, according to this embodiment, if the vehicle 10 is traveling in the manual driving mode when the traveling mode is switched, the amount of torque change produced in the drive power source for traveling subjected to switching in operation upon switching of the traveling mode is set to a larger value than that in the case where the vehicle 10 is traveling in the autonomous driving mode. Therefore, the amount of torque change in the drive power source for traveling subjected to switching in operation upon switching of the traveling mode is made relatively small during autonomous driving, so that switching shock is suppressed. On the other hand, the amount of torque change in the drive power source for traveling subjected to switching in operation upon switching of the traveling mode is made relatively large during manual driving, so that the switching response is improved. It is thus possible to improve the traveling-mode switching response during manual driving, while suppressing traveling-mode switching shock during autonomous driving.

According to this embodiment, if the vehicle 10 is traveling in the manual driving mode when the traveling mode is switched between the HV traveling mode and the EV traveling mode, the amount of torque change produced in the engine 12 is set to a larger value than that in the case where the vehicle 10 is traveling in the autonomous driving mode. Therefore, during autonomous driving, change of the engine torque Te is made relatively small, and switching shock is suppressed. During manual driving, on the other hand, change of the engine torque Te is made relatively large, and the switching response is improved.

Second Embodiment

Next, a second embodiment of the disclosure will be described. In the following description, the same reference numerals are assigned to portions or components that are common to the first and second embodiments, and these portions or components will not be described in detail.

In the first embodiment as described above, the rate of initial rise of the engine torque Te during manual driving is made larger than that during autonomous driving, so that the amount of torque change produced in the engine 12 is increased. In this embodiment, when the vehicle 10 is traveling in the manual driving mode, a length of time it takes to reach a target engine torque Tetgt is set to a shorter time than that in the case where the vehicle 10 is traveling in the autonomous driving mode, so that the amount of torque change produced in the engine 12 is increased.

More specifically, if the traveling condition determining unit 96 determines that the vehicle 10 is traveling in the autonomous driving mode when the traveling condition determining unit 96 determines that there is a request for switching from the EV traveling mode to the HV traveling mode, the traveling mode switching controller 92 sets the length of time it takes to reach the target engine torque Tetgt to a predetermined time T1. On the other hand, if the traveling condition determining unit 96 determines that the vehicle 10 is traveling in the manual driving mode when the traveling condition determining unit 96 determines that there is a request for switching from the EV traveling mode to the HV traveling mode, the traveling mode switching controller 92 sets the length of time it takes to reach the target engine torque Tetgt to a predetermined time T2 (<T1), which is shorter than the reaching time in the case where the vehicle 10 is traveling in the autonomous driving mode. Thus, during manual driving, the amount of torque change produced in the engine 12 is made larger than that during autonomous driving. The target engine torque Tetgt is a target value of engine torque Te for generating required drive torque.

Figure 5:
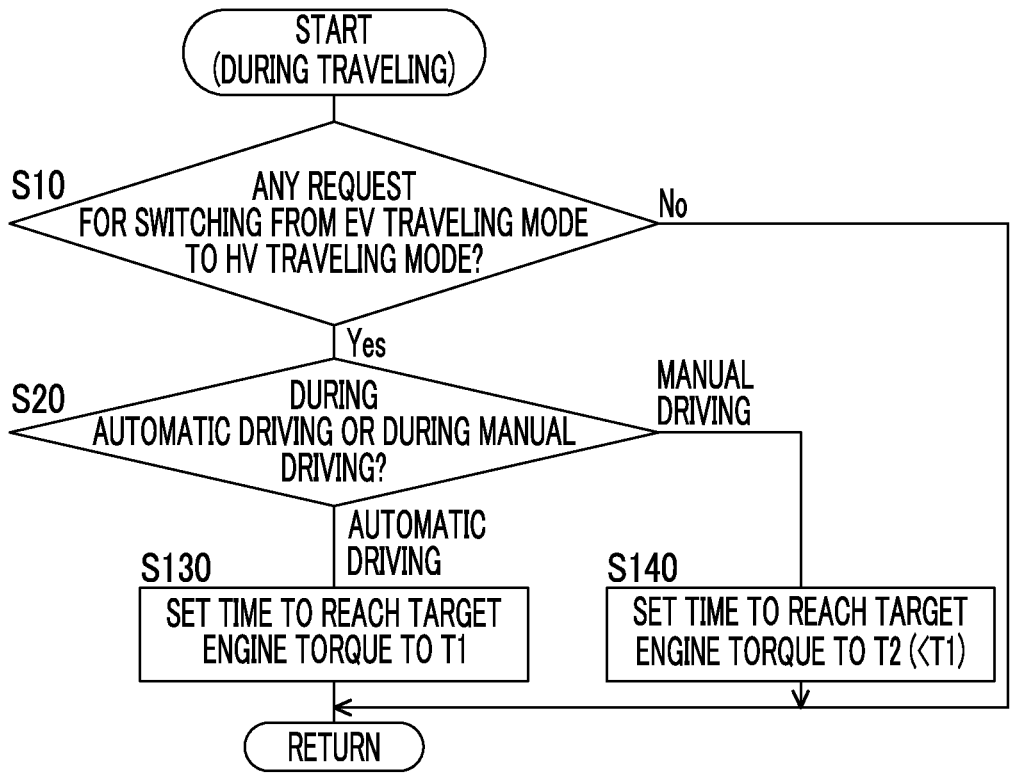
FIG. 5 is a flowchart illustrating a principal part of control operation of an electronic control unit, namely, control operation for achieving switching of the traveling mode in a manner suitable for each of autonomous driving and manual driving, according to a second embodiment.
Figure 6:
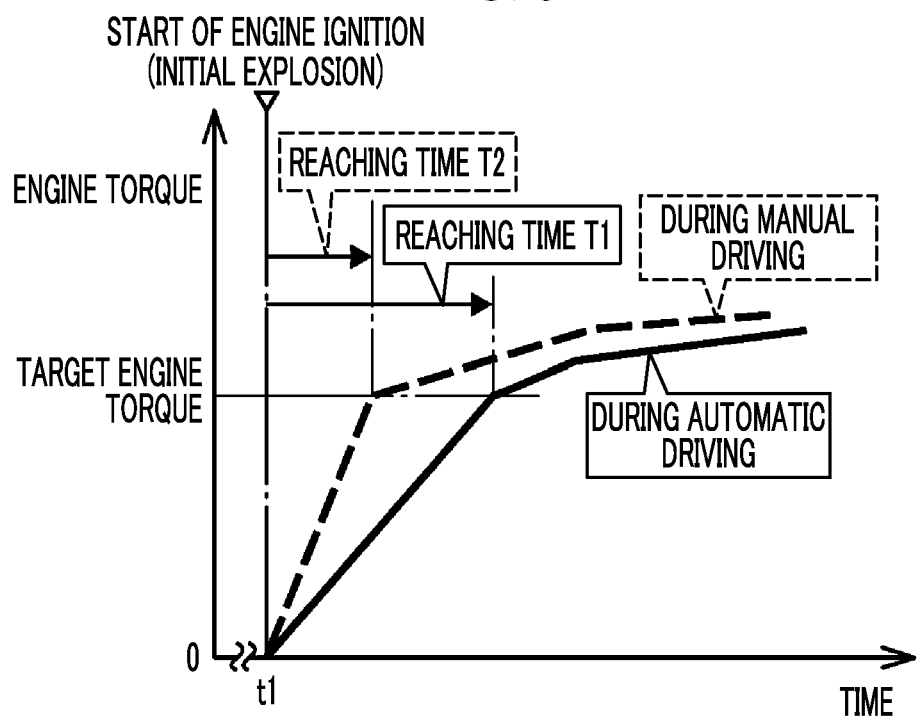
FIG. 6 is a view showing one example of a time chart of the case where the control operation illustrated in the flowchart of FIG. 5 is carried out.

FIG. 5 is a flowchart illustrating a principal part of control operation of the electronic control unit 90, namely, control operation for achieving switching of the traveling mode in a manner suitable for each of autonomous driving and manual driving. A control routine of FIG. 5 is repeatedly executed during traveling, for example. FIG. 6 shows one example of a time chart of the case where the control operation illustrated in the flowchart of FIG. 5 is carried out.

The flowchart of FIG. 5 is mainly different from the flowchart of FIG. 3 in that step S30 and step S40 of FIG. 3 are replaced by step S130 and step S140, respectively. This difference will be mainly described. In FIG. 5, when it is determined in the above step S20 that the vehicle 10 is traveling in the autonomous driving mode, the length of time it takes to reach the target engine torque Tetgt is set to T1, in step S130 corresponding to a function of the traveling mode switching controller 92. On the other hand, when it is determined in the above step S20 that the vehicle 10 is traveling in the manual driving mode, the length of time it takes to reach the target engine torque Tetgt is set to T2 (<T1), in step S140 corresponding to a function of the traveling mode switching controller 92.

FIG. 6 shows one example of the case where a request for switching from the EV traveling mode to the HV traveling mode is generated in response to increase in the accelerator pedal stroke θacc during EV traveling, and the engine 12 is started. In FIG. 6, the engine 12 starts ignition (initial explosion) under starting control of the engine 12 (see time t1 in FIG. 6), so that the engine torque Te starts rising. During autonomous driving as indicated by a solid line, the length of time it takes to reach the target engine torque Tetgt is set to T1. On the other hand, during manual driving as indicated by the broken line, the length of time it takes to reach the target engine torque Tetgt is set to T2, which is shorter than T1, and the amount of torque change produced in the engine 12 is made larger than that during autonomous driving.

As described above, according to this embodiment, if the vehicle 10 is traveling in the manual driving mode when the traveling mode is switched, the amount of torque change produced in the drive power source for traveling subjected to switching in operation upon switching of the traveling mode is made larger than that in the case where the vehicle 10 is traveling in the autonomous driving mode; therefore, substantially the same effects as those of the above first embodiment can be obtained.

Third Embodiment

In this embodiment, when the traveling mode switching controller 92 switches the traveling mode according to accelerating operation of the driver during manual driving, it sets the amount of torque change (when torque is increased) produced in the drive power source for traveling subjected to switching in operation upon switching of the traveling mode, to a larger value when the amount of accelerating operation is large, than that in the case where the amount of accelerating operation is small, in addition to the first and second embodiments as described above. The accelerating operation of the driver is, for example, operation (accelerator operation) of the accelerator pedal by the driver, and its magnitude is represented by the accelerator pedal stroke θacc.

More specifically, the traveling condition determining unit 96 determines whether the accelerator pedal stroke θacc is larger than a given stroke α. The given stroke α is a predetermined threshold value based on which it is determined that the amount of accelerating operation of the driver is large enough to make it necessary to increase the amount of torque change (when torque is increased) produced in the drive power source for traveling subjected to switching in operation upon switching of the traveling mode, for example.

The traveling mode is switched according to the accelerating operation of the driver, when it is switched from the EV traveling mode to the HV traveling mode (namely, when there is a request for switching from the EV traveling mode to the HV traveling mode), for example. If the traveling condition determining unit 96 determines that the vehicle 10 is traveling in the manual driving mode when the traveling condition determining unit 96 determines that there is a request for switching from the EV traveling mode to the HV traveling mode, and further, the traveling condition determining unit 96 determines that the accelerator pedal stroke θacc is equal to or smaller than the given stroke α, the traveling mode switching controller 92 sets the rate of initial rise of the engine torque Te to a predetermined value B (>A), which is larger than the rate of initial rise in the case where the vehicle 10 is traveling in the autonomous driving mode. On the other hand, if the traveling condition determining unit 96 determines that the vehicle 10 is traveling in the manual driving mode when the traveling condition determining unit 96 determines that there is a request for switching from the EV traveling mode to the HV traveling mode, and further, the traveling condition determining unit 96 determines that the accelerator pedal stroke θacc is larger than the given stroke α, the traveling mode switching controller 92 sets the rate of initial rise of the engine torque Te to a predetermined value C (>B), which is larger than the rate of initial rise in the case where the accelerator pedal stroke θacc is equal to or smaller than the given stroke α. Thus, when the amount of accelerating operation is large, the amount of torque change produced in the engine 12 when torque is increased is made larger than that in the case where the amount of accelerating operation is small.

Figure 7:
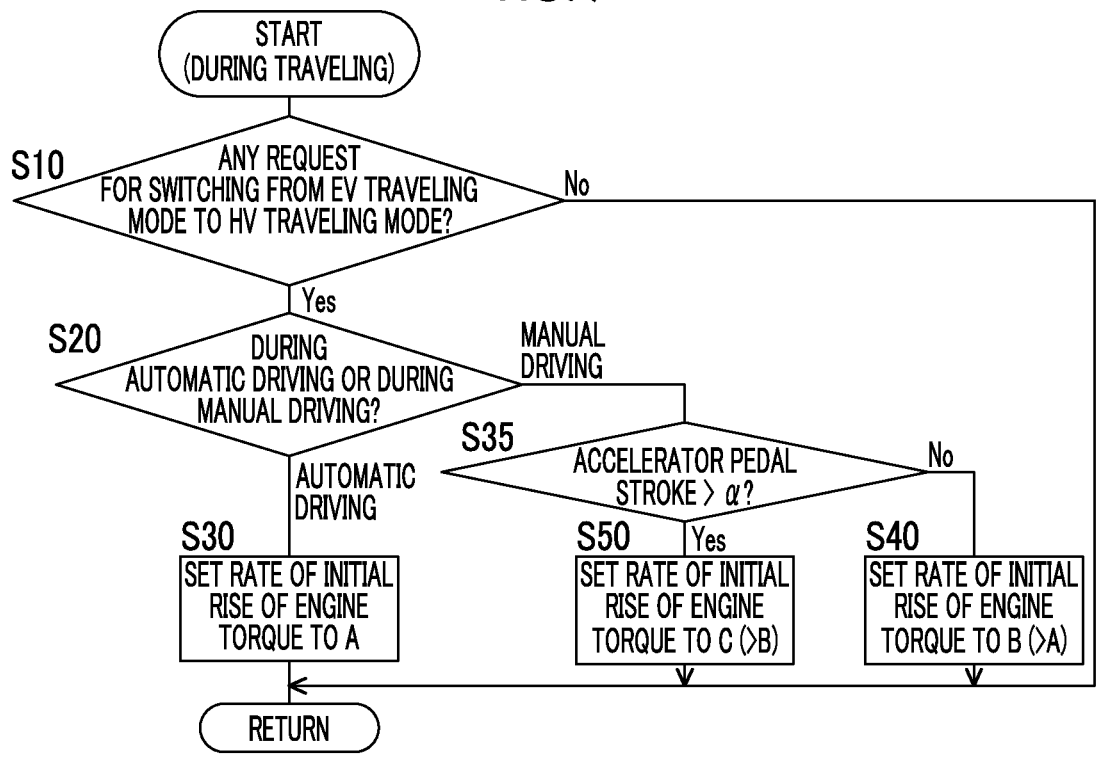
FIG. 7 is a flowchart illustrating a principal part of control operation of an electronic control unit, namely, control operation for achieving switching of the traveling mode in a manner suitable for each of autonomous driving and manual driving, according to a third embodiment.
Figure 8:
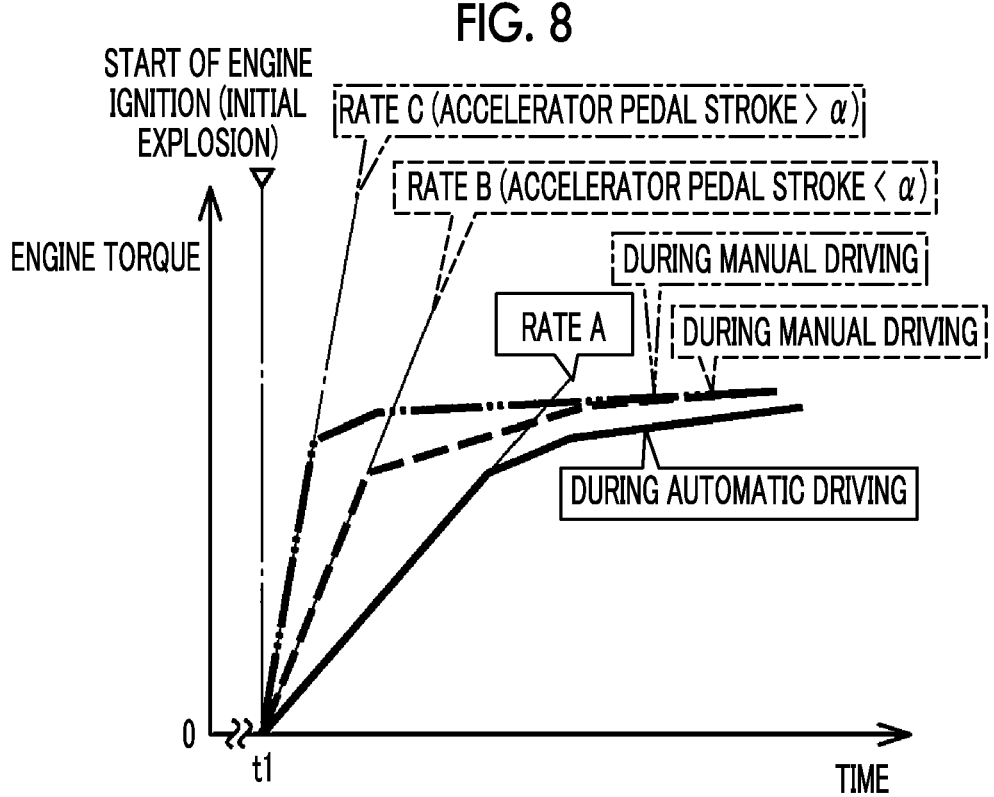
FIG. 8 is a view showing one example of a time chart of the case where the control operation illustrated in the flowchart of FIG. 7 is carried out.

FIG. 7 is a flowchart illustrating a principal part of control operation of the electronic control unit 90, namely, control operation for achieving switching of the traveling mode in a manner suitable for each of autonomous driving and manual driving. A control routine of FIG. 7 is repeatedly executed during traveling, for example. FIG. 8 shows one example of a time chart of the case where the control operation illustrated in the flowchart of FIG. 7 is carried out.

The flowchart of FIG. 7 is mainly different from the flowchart of FIG. 3 in that steps S35 and S50 are added. This difference will be mainly described. In FIG. 7, if it is determined in the above step S20 that the vehicle 10 is traveling in the manual driving mode, it is determined in step S35 corresponding to a function of the traveling condition determining unit 96 whether the accelerator pedal stroke θacc is larger than the given stroke α. If a negative decision (NO) is obtained in step S35, the rate of initial rise of the engine torque Te is set to B (>A), in step S40 corresponding to a function of the traveling mode switching controller 92. On the other hand, if an affirmative decision (YES) is obtained in the above step S35, the rate of initial rise of the engine torque Te is set to C (>B), in step S50 corresponding to a function of the traveling mode switching controller 92.

FIG. 8 shows one example of the case where a request for switching from the EV traveling mode to the HV traveling mode is generated in response to increase of the accelerator pedal stroke θacc during EV traveling, and the engine 12 is started. In FIG. 8, the engine 12 starts ignition (initial explosion) under starting control of the engine 12 (see time t1), and the engine torque Te starts rising or increasing. During autonomous driving as indicated by a solid line in FIG. 8, the rate of initial rise of the engine torque Te is set to A (>0). On one hand, during manual driving where the accelerator pedal stroke θacc is relatively small, as indicated by a broken line in FIG. 8, the rate of initial rise of the engine torque Te is set to B that is larger than A, and the amount of torque change produced in the engine 12 is made larger than that during autonomous driving. On the other hand, during manual driving where the accelerator pedal stroke θacc is relatively large, as indicated by a two-dot chain line in FIG. 8, the rate of initial rise of the engine torque Te is set to C that is larger than B, and the amount of torque change produced in the engine 12 when torque is increased is made larger than that during manual driving where the accelerator pedal stroke θacc is relatively small.

As described above, according to this embodiment, when the amount of accelerating operation is large at the time of switching of the traveling mode caused by accelerating operation during manual driving, the amount of torque change (when torque is increased) produced in the drive power source for traveling subjected to switching in operation upon switching of the traveling mode is made relatively large, so that switching of the traveling mode with good response according to the driver's intention to accelerate the vehicle can be achieved.

Fourth Embodiment

In the first through third embodiments as described above, the request for switching between the HV traveling mode and the EV traveling mode is a request for switching from the EV traveling mode to the HV traveling mode. In this embodiment, the request for switching between the HV traveling mode and the EV traveling mode is a request for switching from the HV traveling mode to the EV traveling mode.

When the request for switching between the HV traveling mode and the EV traveling mode is the request for switching from the HV traveling mode to the EV traveling mode, operation of the engine 12 as the drive power source for traveling subjected to switching in operation upon switching of the traveling mode is stopped, and the engine torque Te is reduced toward zero. If the traveling condition determining unit 96 determines that the vehicle 10 is traveling in the autonomous driving mode when the traveling condition determining unit 96 determines that there is a request for switching from the HV traveling mode to the EV traveling mode, the traveling mode switching controller 92 sets the rate of reduction of the engine torque Te to a predetermined value A (<0). On the other hand, if the traveling condition determining unit 96 determines that the vehicle 10 is traveling in the manual driving mode when it determines that there is a request for switching from the HV traveling mode to the EV traveling mode, the traveling mode switching controller 92 sets the rate of reduction of the engine torque Te to a predetermined value B (|B|>|A|), which is a larger rate (absolute value) than the rate (absolute value) in the case where the vehicle 10 is traveling in the autonomous driving mode. Thus, when the vehicle 10 is traveling in the manual driving mode, the amount of torque change produced in the engine 12 is made large than that in the case where the vehicle 10 is traveling in the autonomous driving mode.

When operation of the engine 12 is stopped in response to switching from the HV traveling mode to the EV traveling mode, the engine speed Ne is also reduced toward zero. In this connection, if rotation of the engine 12 is rapidly stopped, vibration, or the like, may be generated when stopping of rotation of the engine 12 is completed. Thus, when the traveling mode is switched from the HV traveling mode to the EV traveling mode, the traveling mode switching controller 92 reduces engine torque Te such that the rate (absolute value) of reduction of the engine speed Ne immediately before completion of stopping in the process of stopping operation of the engine 12 becomes smaller (gentler) than the rate (absolute value) of reduction of the engine speed Ne immediately after the stopping is started.

Figure 9:
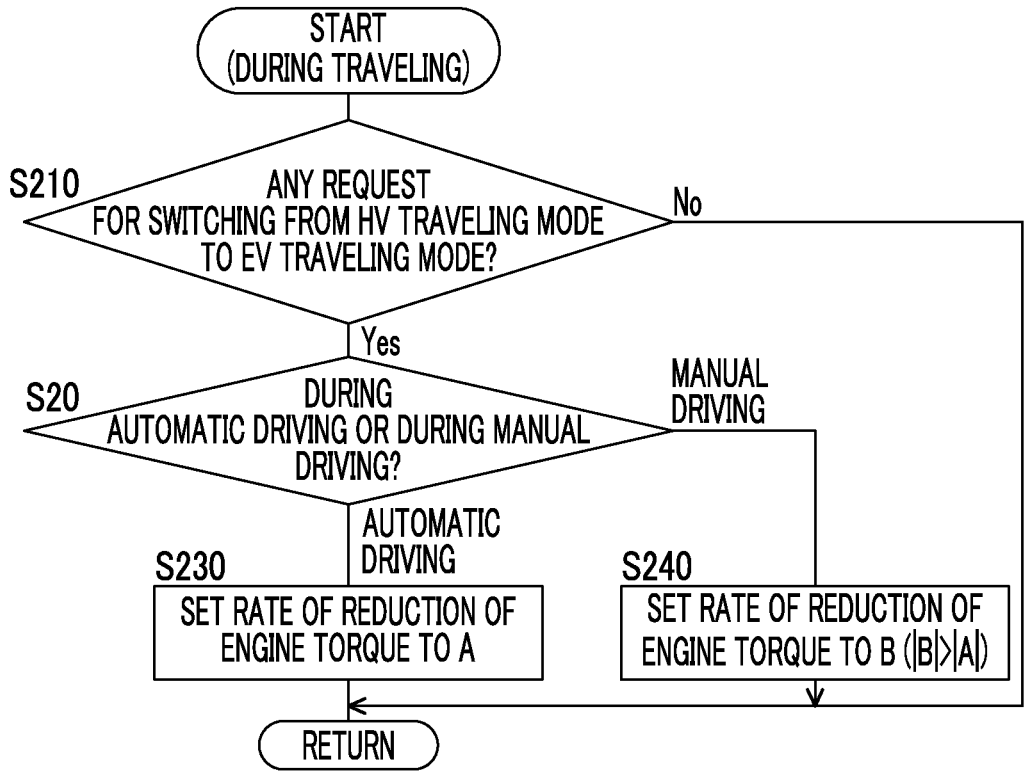
FIG. 9 is a flowchart illustrating a principal part of control operation of an electronic control unit, namely, control operation for achieving switching of the traveling mode in a manner suitable for each of autonomous driving and manual driving, according to a fourth embodiment.

FIG. 9 is a flowchart illustrating a principal part of control operation of the electronic control unit 90, namely, control operation for achieving switching of the traveling mode in a manner suitable for each of autonomous driving and manual driving. A control routine of FIG. 9 is repeatedly executed during traveling, for example. Each of FIG. 10 and FIG. 11 shows one example of a time chart of the case where the control operation illustrated in the flowchart of FIG. 9 is carried out.

In FIG. 9, initially in step S210 corresponding to a function of the traveling condition determining unit 96, it is determined whether there is a request for switching from the HV traveling mode to the EV traveling mode. When a negative decision (NO) is obtained in step S210, the current cycle of this routine ends. If an affirmative decision (YES) is obtained in step S210, it is determined in step S20 corresponding to a function of the traveling condition determining unit 96 whether the vehicle 10 is traveling in the autonomous driving mode, or in the manual driving mode. If it is determined in step S20 that the vehicle 10 is traveling in the autonomous driving mode, the rate of reduction of the engine torque Te is set to A (<0), in step S230 corresponding to a function of the traveling mode switching controller 92. On the other hand, if it is determined in the above step S20 that the vehicle 10 is traveling in the manual driving mode, the rate of reduction of the engine torque Te is set to B (|B|>|A|), in step S240 corresponding to a function of the traveling mode switching controller 92.

Figure 10:
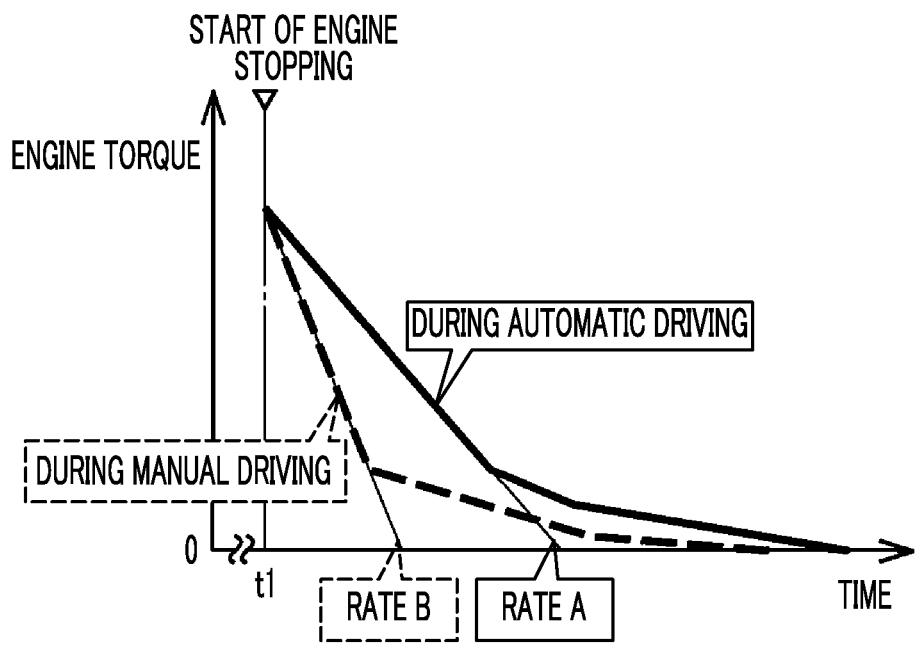
FIG. 10 is a view showing one example of a time chart of the case where the control operation illustrated in the flowchart of FIG. 9 is carried out.

FIG. 10 shows one example of the case where a request for switching from the HV traveling mode to the EV traveling mode is generated due to reduction of the accelerator pedal stroke θacc during HV traveling, and operation of the engine 12 is stopped. In FIG. 10, stopping of operation of the engine 12 is started (see time t1) under stopping control of the engine 12, and the engine torque Te is reduced. During autonomous driving as indicated by a solid line, the rate of reduction of the engine torque Te is set to A (<0). On the other hand, during manual driving as indicated by a broken line, the rate (absolute value) of reduction of engine torque Te is set to B that is larger than that during autonomous driving, and the amount of torque change produced in the engine 12 is made larger than that during autonomous driving.

Figure 11:
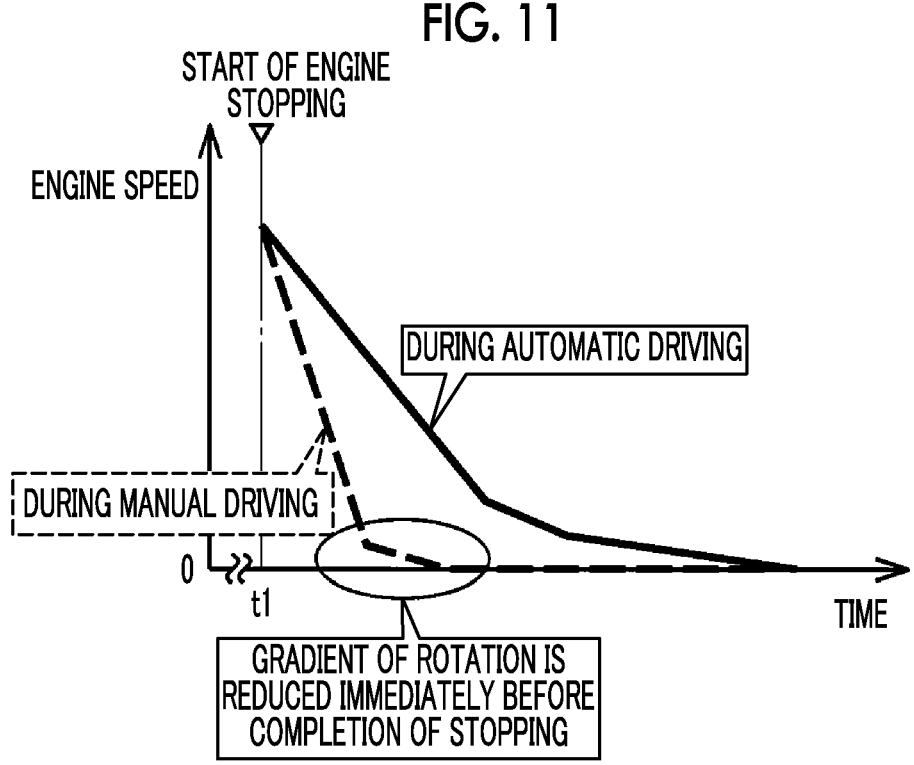
FIG. 11 is a view showing one example of a time chart of the case where the control operation illustrated in the flowchart of FIG. 9 is carried out.

FIG. 11 shows one example of the case where a request for switching from the HV traveling mode to the EV traveling mode is generated due to reduction of the accelerator pedal stroke θacc during HV traveling, and operation of the engine 12 is stopped. In the example of FIG. 11, a phenomenon that occurs when operation of the engine 12 is stopped is expressed or represented by use of the engine speed Ne, in place of the engine torque Te. In FIG. 11, stopping of operation of the engine 12 is started (see time t1) under stopping control of the engine 12, and the engine speed Ne is reduced. During autonomous driving as indicated by a solid line, the engine speed Ne is slowly or gently reduced. On the other hand, during manual driving as indicated by a broken line, the engine speed Ne is rapidly reduced. At this time, immediately before stopping of rotation of the engine 12 is completed, the gradient (absolute value) of rotation or rotational speed is made smaller than that immediately after start of stopping of rotation, so that vibration, or the like, at the time of completion of stopping of rotation, is suppressed.

As described above, according to this embodiment, if the vehicle 10 is traveling in the manual driving mode when the traveling mode is switched, the amount of torque change produced in the drive power source for traveling subjected to switching in operation upon switching of the traveling mode is made larger than that in the case where the vehicle 10 is traveling in the autonomous driving mode. Therefore, substantially the same effects as those of the above first embodiment are obtained.

Also, according to this embodiment, when the traveling mode is switched from the HV traveling mode to the EV traveling mode, the rate (absolute value) of reduction of the engine speed Ne immediately before completion of stopping in the process of stopping operation of the engine 12 is made smaller than that immediately after the start of stopping. It is thus possible to reduce vibration, or the like, at the time of completion of stopping of the engine 12, while improving the response in switching from the HV traveling mode to the EV traveling mode.

Fifth Embodiment

In the first through fourth embodiments as described above, switching of the traveling mode is switching between the HV traveling mode and the EV traveling mode. In this embodiment, switching of the traveling mode is switching between the single-drive EV traveling mode and the both-drive EV traveling mode.

The traveling condition determining unit 96 determines whether it is the time to switch the traveling mode between the single-drive EV traveling mode and the both-drive EV traveling mode, namely, whether there is a request for switching between the single-drive EV traveling mode and the both-drive EV traveling mode. The request for switching between the single-drive EV traveling mode and the both-drive EV traveling mode may be a request for switching from the single-drive EV traveling mode to the both-drive EV traveling mode, for example. In another example, the request for switching between the single-drive EV traveling mode and the both-drive EV traveling mode may be a request for switching from the both-drive EV traveling mode to the single-drive EV traveling mode, for example.

If the traveling condition determining unit 96 determines that the vehicle 10 is traveling in the manual driving mode when the traveling condition determining unit 96 determines that there is a request for switching between the single-drive EV traveling mode and the both-drive EV traveling mode, the traveling mode switching controller 92 sets the amount of torque change produced in the first rotating machine MG1 as the drive power source for traveling subjected to switching in operation upon switching of the traveling mode, to a larger value than that in the case where the traveling condition determining unit 96 determines that the vehicle 10 is traveling in the autonomous driving mode.

When the request for switching between the single-drive EV traveling mode and the both-drive EV traveling mode is a request for switching from the single-drive EV traveling mode to the both-drive EV traveling mode, the first rotating machine MG1 as the drive power source for traveling subjected to switching in operation upon switching of the traveling mode is driven, and the MG1 torque Tg is caused to rise or increase. If the traveling condition determining unit 96 determines that the vehicle 10 is traveling in the autonomous driving mode when the traveling condition determining unit 96 determines that there is a request for switching from the single-drive EV traveling mode to the both-drive EV traveling mode, the traveling mode switching controller 92 sets the rate of initial rise of the MG1 torque Tg to a predetermined value A (>0). On the other hand, if the traveling condition determining unit 96 determines that the vehicle 10 is traveling in the manual driving mode when the traveling condition determining unit 96 determines that there is a request for switching from the single-drive EV traveling mode to the both-drive EV traveling mode, the traveling mode switching controller 92 sets the rate of initial rise of the MG1 torque Tg to a predetermined value B (<A), which is larger than the rate in the case where the vehicle 10 is traveling in the autonomous driving mode. Thus, when the vehicle 10 is traveling in the manual traveling mode, the amount of torque change produced in the first rotating machine MG1 is made larger than that in the case where the vehicle 10 is traveling in the autonomous driving mode.

Figure 12:
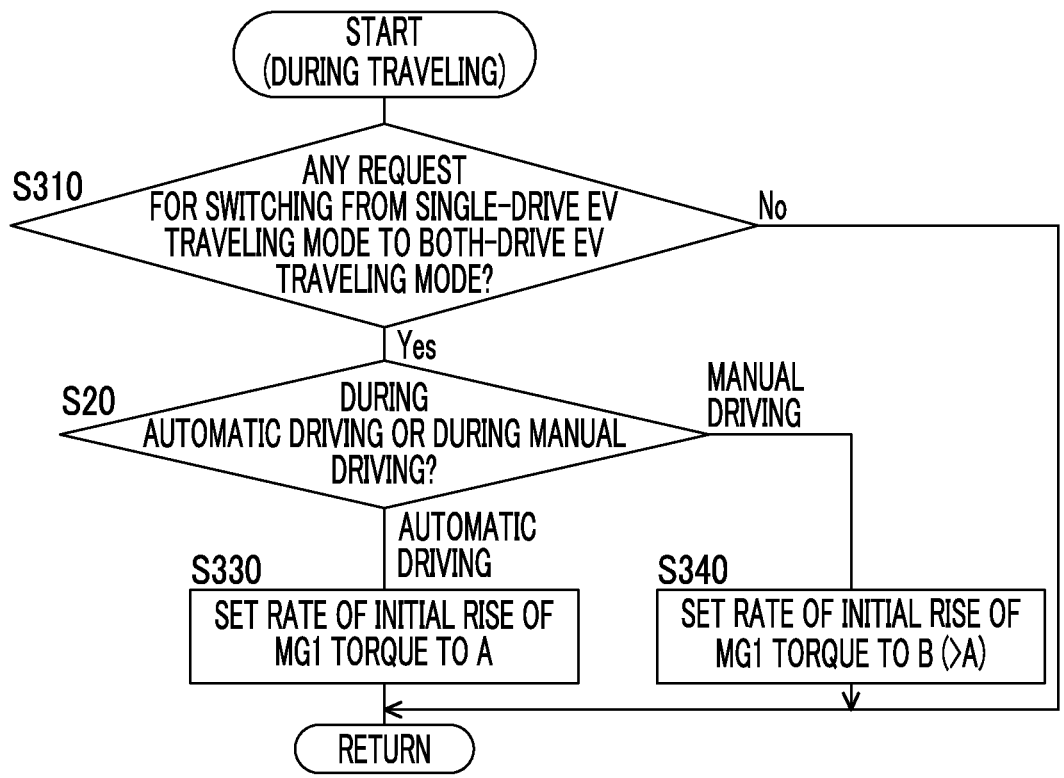
FIG. 12 is a flowchart illustrating a principal part of control operation of an electronic control unit, namely, control operation for achieving switching of the traveling mode in a manner suitable for each of autonomous driving and manual driving, according to a fifth embodiment.
Figure 13:
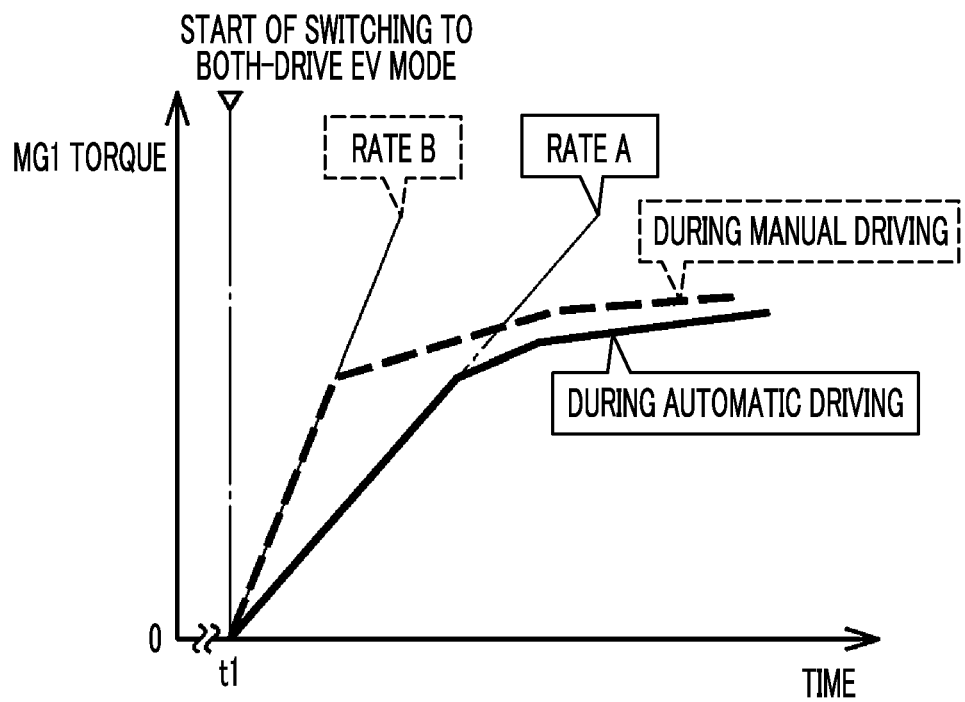
FIG. 13 is a view showing one example of a time chart of the case where the control operation illustrated in the flowchart of FIG. 12 is carried out.

FIG. 12 is a flowchart illustrating a principal part of control operation of the electronic control unit 90, namely, control operation for achieving switching of the traveling mode in a manner suitable for each of autonomous driving and manual driving. A control routine of FIG. 12 is repeatedly executed during traveling, for example. FIG. 13 shows one example of a time chart of the case where the control operation illustrated in the flowchart of FIG. 12 is carried out.

In FIG. 12, initially in step S310 corresponding to a function of the traveling condition determining unit 96, it is determined whether there is a request for switching from the single-drive EV traveling mode to the both-drive EV traveling mode. If a negative decision (NO) is obtained in step S310, the current cycle of this routine ends. If an affirmative decision (YES) is obtained in step S310, it is determined in step S20 corresponding to a function of the traveling condition determining unit 96 whether the vehicle 10 is in the autonomous driving mode or in the manual driving mode. If it is determined in step S20 that the vehicle 10 is traveling in the autonomous driving mode, the rate of initial rise of the MG1 torque Tg is set to A (>0), in step S330 corresponding to a function of the traveling mode switching controller 92. On the other hand, if it is determined in the above step S20 that the vehicle 10 is traveling in the manual driving mode, the rate of initial rise of the MG1 torque Tg is set to B (>A), in step S340 corresponding to a function of the traveling mode switching controller 92.

FIG. 13 shows one example of the case where a request for switching from the single-drive EV traveling mode to the both-drive EV traveling mode is generated in response to increase of the accelerator pedal stroke θacc during EV traveling in the single-drive EV traveling mode, and the first rotating machine MG1 is driven in addition to the second rotating machine MG2. In FIG. 13, the traveling mode is switched from the single-drive EV traveling mode to the both-drive EV traveling mode (see time t1), and the MG1 torque Tg starts rising or increasing. During autonomous driving as indicated by a solid line, the rate of initial rise of the MG1 torque Tg is set to A (>0). On the other hand, during manual driving as indicated by a broken line, the rate of initial rise of the MG1 torque Tg is set to B that is larger than A, and the amount of torque change produced in the first rotating machine MG1 is made larger than that in the case where the vehicle 10 is traveling in the automatic traveling mode.

As described above, according to this embodiment, if the vehicle 10 is traveling in the manual driving mode when the traveling mode is switched, the amount of torque change produced in the drive power source for traveling subjected to switching in operation upon switching of the traveling mode is made larger than that in the case where the vehicle 10 is traveling in the autonomous driving mode; therefore, substantially the same effects as those of the above first embodiment are obtained.

While some embodiments of the disclosure have been described in detail based on the drawings, this disclosure may be applied in other forms.

While the amount of torque change produced in the engine 12 is switched by switching the rate of reduction of the engine torque Te, in the fourth embodiment as described above, the amount of torque change produced in the engine 12 may be switched by switching the length of time it takes to reach a target value (in this case, zero, for example) of the engine torque Te, as in the second embodiment as described above. Also, in the above fourth embodiment, when the vehicle 10 is traveling in the manual driving mode, the amount of torque change produced in the engine 12 when torque is reduced may be further switched depending on the amount of decelerating operation, as in the third embodiment as described above.

While the amount of torque change produced in the first rotating machine MG1 is switched by switching the rate of initial rise of the MG1 torque Tg, in the fifth embodiment as described above, the amount of torque change produced in the first rotating machine MG1 may be switched by switching the length of time it takes to reach a target value of the MG1 torque Tg, as in the above second embodiment. Also, in the fifth embodiment, when the vehicle 10 is traveling in the manual driving mode, the amount of torque change produced in the first rotating machine MG1 when torque is increased may be further switched, depending on the amount of accelerating operation, as in the above third embodiment.

In the above fifth embodiment, the request for switching between the single-drive EV traveling mode and the both-drive EV traveling mode is the request for switching from the single-drive EV traveling mode to the both-drive EV traveling mode. The disclosure may also be applied to the case where the request for switching between the single-drive EV traveling mode and the both-drive EV traveling mode is the request for switching from the both-drive EV traveling mode to the single-drive EV traveling mode. When it is the request for switching from the both-drive EV traveling mode to the single-drive EV traveling mode, driving of the first rotating machine MG1 as the drive power source for traveling subjected to switching in operation upon switching of the traveling mode is stopped, and the MG1 torque Tg is reduced toward zero. Therefore, in this case, the amount of torque change produced in the first rotating machine MG1 may be switched by switching the rate of reduction of the MG1 torque Tg, as in the above fourth embodiment. In another example, in this case, the amount of torque change produced in the first rotating machine MG1 may be switched by switching the length of time it takes to reach a target value (in this case, zero, for example) of the MG1 torque Tg, as in the above second embodiment. Also, in this case, when the vehicle 10 is traveling in the manual driving mode, the amount of torque change produced in the first rotating machine MG1 when torque is reduced may be switched, depending on the amount of decelerating operation, as in the above third embodiment.

In the above embodiments, A, B, C are used by way of example as values of the rate, and T1, T2 are used by way of example as values of the reaching time. These values are used for comparing the rate of change, and the length of reaching time, and each of A, B, C, T1, T2 does not assume the same value (numerical value) in each of the embodiments. In each embodiment, A, B, C, T1, T2 are respectively set as appropriate in accordance with the mode of carrying out the disclosure in the embodiment.

In the above embodiments, the vehicle 10 is basically operated in the autonomous driving mode, by automatically performing actions, such as running (acceleration/deceleration), turning (steering), stopping (braking), etc. through control operation by the electronic control unit 90, without depending on driving operation (accelerating operation, steering operation, braking operation) of the driver. However, the disclosure is not limited to this mode of autonomous driving. For example, the autonomous driving mode may include cruise control, i.e., controlling drive torque so that the vehicle speed follows a set vehicle speed, while taking account of a distance from a forward vehicle, or the like.

While the brake B is used by way of example as the lock mechanism in the above embodiments, the disclosure is not limited to the use of the brake. For example, the lock mechanism may be a one-way clutch that inhibits rotation of the crankshaft of the engine 12 in the negative rotational direction while permitting rotation of the crankshaft in the positive rotational direction, dog clutch, dry engagement device, electromagnetic friction device (electromagnetic clutch) whose operating state is controlled by an electromagnetic actuator, magnetic powder clutch, or the like. Also, the lock mechanism is not necessarily required, in embodiments where the both-drive EV traveling mode is not included as a traveling mode.

In the above embodiments, the gear train of the vehicle 10 is arranged such that the second rotating machine MG2 is disposed on an axis that is different from the axis of the input shaft 20. However, the gear train may be arranged such that the second rotating machine MG2 is disposed on the same axis as the axis of the input shaft 20, for example. Also, the drive wheels W to which the second rotating machine MG2 is coupled such that power can be transmitted thereto may not necessarily be the same as the drive wheels 14 to which the output rotating member of the speed change unit 22 is coupled such that power can be transmitted thereto. For example, one pair of the front wheels and the rear wheels may be the drive wheels 14, and the other pair may be the drive wheels W. In this case, the drive wheels 14 and the drive wheels W are drive wheels, and the output rotating member of the speed change unit 22 and the second rotating machine MG2 are both coupled to the drive wheels such that power can be transmitted thereto.

In the above embodiments, the planetary gear mechanism 38 may be of a single planetary type or a double planetary type. Also, the planetary gear mechanism 38 may be a differential gear unit in which a pinion that is rotated/driven by the engine 12, and a pair of bevel gears that mesh with the pinion are operatively coupled to the first rotating machine MG1 and the drive gear 24. Also, the planetary gear mechanism 38 may be a mechanism that is configured such that two or more planetary gear sets are coupled to each other via a part of rotating elements that constitute the gear sets, and the engine, rotating machine, and the drive wheels are respectively coupled to the rotating elements of the planetary gear sets such that power can be transmitted to these elements.

While the vehicle 10 includes the engine 12, first rotating machine MG2, and the second rotating machine MG2 as a plurality of drive power sources in the above embodiments, this disclosure is not limited to this arrangement. For example, in the embodiments in which the traveling mode is switched between the HV traveling mode and the EV traveling mode, the vehicle may be only required to include at least an engine and a rotating machine. Accordingly, the disclosure may be applied to a vehicle including an engine, a transmission provided in a power transmission path between the engine and drive wheels, and a rotating machine coupled to an input rotating member of the transmission such that power can be transmitted thereto, for example. In the embodiment in which the traveling mode is switched between the single-drive EV traveling mode and the both-drive EV traveling mode, the vehicle may be only required to include at least two rotating machines. Accordingly, the disclosure may be applied to an electric vehicle that includes two rotating machines, and is able to be switched between an EV traveling mode using only one rotating machine, and an EV traveling mode using both of the rotating machines, for example. In sum, the disclosure may be applied to any type of vehicle provided that the vehicle includes two or more drive power sources, and can be switched between/ among two or more traveling modes in which different ones of the drive power sources are used as the drive power source(s) for traveling, according to traveling conditions, while the vehicle can be switched between the autonomous driving mode and the manual driving mode.

It is to be understood that the embodiments as described above are merely exemplary embodiments, and that the disclosure may be embodied with various changes, or improvements, based on the knowledge of those skilled in the art.

What is claimed is:

1. A control device for a vehicle, the vehicle including a plurality of drive power sources, the control device comprising:
an electronic control unit configured to:
switch a traveling mode of the vehicle according to traveling conditions of the vehicle, the traveling mode being selectable from a plurality of modes, each mode using different drive power sources of the plurality of drive power sources as the drive power source for traveling which generates drive torque;
switch driving control of the vehicle between (i) autonomous driving under autonomous driving control and (ii) manual driving, based on a driving operation by a driver; and
control an amount of torque change produced in the drive power source for traveling which is subjected to switching due to switching of the traveling mode, the amount of torque change being controlled such that the amount of torque change produced at the time of switching of the traveling mode during the manual driving is larger than the amount of torque change produced at the time of switching of the traveling mode during the autonomous driving.

2. The control device for a vehicle according to claim 1, wherein:

the electronic control unit is configured to increase torque produced in the drive power source for traveling which is subjected to switching, the torque being increased when the electronic control unit switches the traveling mode in response to an accelerating operation by the driver during the manual driving; and
when the electronic control unit switches the traveling mode in response to the accelerating operation, the electronic control unit is configured to set the amount of torque change when an amount of the accelerating operation by the driver is large, to a larger value than the amount of torque change when the amount of the accelerating operation is small.

3. The control device for a vehicle according to claim 1, wherein:

the electronic control unit is configured to reduce torque produced in the drive power source for traveling which is subjected to switching, the torque being reduced when the electronic control unit switches the traveling mode in response to a decelerating operation of by the driver during the manual driving; and
when the electronic control unit switches the traveling mode in response to the decelerating operation, the electronic control unit is configured to set the amount of torque change when an amount of the decelerating operation by the driver is large, to a larger value than the amount of torque change when the amount of the decelerating operation is small.

4. The control device for a vehicle according to claim 1, wherein:

the drive power sources include an engine and a motor;
the traveling mode is selectable from a hybrid traveling mode and a motor traveling mode, the hybrid traveling mode being a mode in which at least the engine is used as the drive power source for traveling, the motor traveling mode being a mode in which the motor is used as the drive power source for traveling; and
the electronic control unit is configured to set the amount of torque change produced in the engine when the electronic control unit switches the traveling mode between the hybrid traveling mode and the motor traveling mode during the manual driving, to a larger value than the amount of torque change produced in the engine when the electronic control unit switches the traveling mode between the hybrid traveling mode and the motor traveling mode during the autonomous driving.

5. The control device for a vehicle according to claim 1, wherein:

the drive power sources include a first motor and a second motor;
the traveling mode is selectable from a both-drive motor traveling mode and a single-drive motor traveling mode, the both-drive motor traveling mode being a mode in which the first motor and the second motor are used as the drive power sources for traveling, the single-drive motor traveling mode being a mode in which only the second motor is used as the drive power source for traveling; and
the electronic control unit is configured to set the amount of torque change produced in the first motor when the electronic control unit switches the traveling mode between the both-drive motor traveling mode and the single-drive motor traveling mode during the manual driving, to a larger value than the amount of torque change produced in the first motor when the electronic control unit switches the traveling mode between the both-drive motor traveling mode and the single-drive motor traveling mode during the autonomous driving.

6. A control method for a vehicle, the vehicle including a plurality of drive power sources and an electronic control unit, the control method comprising:

switching, by the electronic control unit, a traveling mode of the vehicle according to traveling conditions of the vehicle, the traveling mode being selectable from a plurality of modes, each mode using different drive power sources of the plurality of drive power sources as the drive power source for traveling which generates drive torque;

switching, by the electronic control unit, driving control of the vehicle between (i) autonomous driving under autonomous driving control and (ii) manual driving based on a driving operation by a driver; and controlling, by the electronic control unit, an amount of torque change produced in the drive power source for traveling which is subjected to switching due to switching of the traveling mode, the amount of torque change being controlled such that the amount of torque change produced at the time of switching of the traveling mode during the manual driving is larger than the amount of torque change produced at the time of switching of the traveling mode during the autonomous driving.

* * * * *